(No Model.)

W. T. CARROLL.
SPINDLE BEARING.

No. 290,397. Patented Dec. 18, 1883.

Witnesses
Fred A. Powell
John F. C. Brainerd

Inventor
William T Carroll
by Crosby Gregory attys

UNITED STATES PATENT OFFICE.

WILLIAM T. CARROLL, OF WORCESTER, ASSIGNOR TO GEORGE DRAPER & SONS, OF HOPEDALE, MASSACHUSETTS.

SPINDLE-BEARING.

SPECIFICATION forming part of Letters Patent No. 290,397, dated December 18, 1883.

Application filed November 23, 1882. (No model.)

*To all whom it may concern:*

Be it known that I, WILLIAM T. CARROLL, of Worcester, county of Worcester, and State of Massachusetts, have invented an Improvement in Spindle-Bearings, of which the following description, in connection with the accompanying drawings, is a specification, like letters on the drawings representing like parts.

This invention has for its object a novel construction of bearing to support a live-spindle in a yielding manner, whereby it may move more or less, as is necessary, to enable the said spindle to find and rotate at its true center according to the load carried by the spindle.

My invention consists in a bolster-receiving tube and a bolster combined with screws having flexible or yielding bearing ends, the latter acting against the upper end of the bolster; also, a live-spindle, a bolster, a bolster-receiving tube, a pin or stud to support it, and an elastic or flexible bearing interposed between the said tube and pin or stud combined with a metal step-plate fitted closely to the interior of the said tube to prevent the flow of oil below it, and to support the said spindle.

Figure 1:
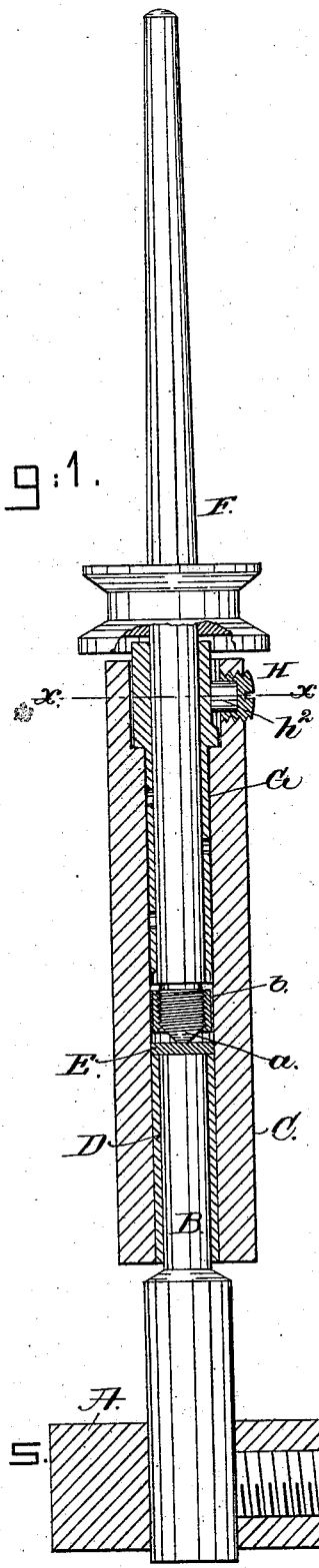
Figure 2:
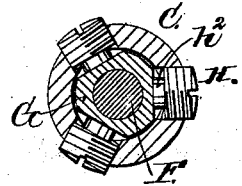

Figure 1 represents in partial vertical section a spindle, bolster, bolster-receiving tube, and flexible bushing applied to a pin or stud, which in elevation is extended above the step-rail; and Fig. 2, a section of the bolster and its receiving-tube in the line $x\,x$, Fig. 1, the three yielding screws for holding the bolster being in elevation.

The screw A' in the step-rail A holds the pin or stud B, which supports the bolster-receiving tube C, a yielding bushing or tube, D, being, however, interposed between them, as shown in Fig. 1, which enables the tube C to move a little in any direction with the spindle as it, in rapid rotation and unevenly loaded, moves to find its true center of rotation according to its load.

To obviate spoiling the india-rubber bushing or tube D by the action of oil, a metal step-plate, E, is driven or fitted into the tube C so closely as to prevent the passage of oil below it, and the said plate, resting upon the top of the stud or pin B, receives upon it and acts as a step for the lower end, $a$, of the spindle F. The spindle F is extended down through the bolster G, placed loosely in the tube C, and its lower end is provided with a screw-thread, to receive upon it the sleeve $b$, preferably of such diameter as not to touch the tube C. The screw-thread connecting the sleeve and spindle is cut opposite the direction of rotation of the spindle. When a bobbin is being doffed, the upper end of the sleeve $b$ will strike the lower end of the bolster and prevent the lifting of the spindle from the bolster. The length of the pin or stud and that of the bushing D within the tube and the solidity of the bushing will be sufficient to overcome the tendency of the band-pull to deflect the spindle out of perpendicular. The upper end of the bolster has three flat sides, (see Fig. 2,) which receive against them the india rubber or flexible or elastic bearing ends $h^2$ of the screws H, herein shown as made of shells to receive the said flexible bearing-ends, so that the bolster may yield a little, if necessary, after the screws have been set or turned in.

I am aware that parts of a dead-spindle have been united by fitting a reduced end of one part into a socket in another part, a flexible or elastic packing being interposed between them.

I claim—

1. The bolster-receiving tube and bolster, combined with the screws H $h^2$, having flexible or yielding bearing ends, as and for the purpose set forth.

2. The live-spindle, the bolster, the bolster-receiving tube, pin or stud to support it, and an elastic or flexible bearing interposed between the said tube and pin or stud, combined with a metal step-plate fitted closely to the interior of the said tube, to prevent the flow of oil below it and to support the said spindle, substantially as described.

In testimony whereof I have signed my name to this specification in the presence of two subscribing witnesses.

WILLIAM T. CARROLL.

Witnesses:
PETER S. MAHER,
EBEN S. DRAPER.